United States Patent
Pereira et al.

(10) Patent No.: US 8,939,401 B2
(45) Date of Patent: Jan. 27, 2015

(54) SYSTEM FOR CONTROLLING THE COWL OF A TURBOJET ENGINE NACELLE THRUST REVERSER

(75) Inventors: David Pereira, Limours (FR); Jean Lamarre, Bures sur Yvette (FR); Philippe Vancon, La Celle Saint Cloud (FR); Manuel Sanchez, Versailles (FR)

(73) Assignee: Aircelle, Gonfreville L'Orcher (FR)

( * ) Notice: Subject to any disclaimer, the term of this patent is extended or adjusted under 35 U.S.C. 154(b) by 1108 days.

(21) Appl. No.: 12/867,432

(22) PCT Filed: Nov. 21, 2008

(86) PCT No.: PCT/FR2008/001632
§ 371 (c)(1),
(2), (4) Date: Aug. 12, 2010

(87) PCT Pub. No.: WO2010/055213
PCT Pub. Date: May 20, 2010

(65) Prior Publication Data
US 2011/0014043 A1    Jan. 20, 2011

(30) Foreign Application Priority Data
Feb. 13, 2008    (FR) ..................................... 08 00773

(51) Int. Cl.
*F02K 1/32* (2006.01)
*F02K 1/76* (2006.01)

(52) U.S. Cl.
CPC .............. *F02K 1/763* (2013.01); *Y02T 50/671* (2013.01)
USPC ..... 244/110 B; 60/226.2; 60/230; 239/265.29

(58) Field of Classification Search
USPC .......... 60/226.2, 230; 244/110 B; 239/265.29
See application file for complete search history.

(56) References Cited

U.S. PATENT DOCUMENTS

| | | | | | |
|---|---|---|---|---|---|
| 5,899,411 A | * | 5/1999 | Latos et al. | ................. | 244/53 A |
| 5,960,626 A | * | 10/1999 | Baudu et al. | ................. | 60/226.2 |
| 6,094,908 A | * | 8/2000 | Baudu et al. | ................. | 60/226.2 |

(Continued)

FOREIGN PATENT DOCUMENTS

| | | |
|---|---|---|
| EP | 0843089 | 5/1998 |
| FR | 701058 | 3/1931 |

(Continued)

OTHER PUBLICATIONS

Marin Martinod, English translation of WO2006/134253, Dec. 21, 2006, Escapenet.*

(Continued)

*Primary Examiner* — John K Fristoe, Jr.
*Assistant Examiner* — Seth W Mackay-Smith
(74) *Attorney, Agent, or Firm* — Brinks Gilson & Lione

(57) ABSTRACT

A nacelle for a turbojet engine includes an air inlet forward section, a median section surrounding a fan of the turbojet engine, an aft section equipped with a thrust reverser system, a power control unit able to convert a high voltage electric supply into an electric supply towards an electromechanical actuator, and a drive unit for the power control unit which is distinct and separate from the latter and has a control input and a drive output to be connected to the power control unit. The thrust reverser system includes a mobile cowl which, under action of an electromechanical actuator, is able to move from a closed position to an open position in which the mobile cowl opens a passage in the nacelle.

13 Claims, 2 Drawing Sheets

(56) References Cited

U.S. PATENT DOCUMENTS

| | | | |
|---|---|---|---|
| 6,439,504 B1 * | 8/2002 | Ahrendt | 244/110 B |
| 6,622,963 B1 * | 9/2003 | Ahrendt et al. | 244/54 |
| 6,655,125 B2 * | 12/2003 | Johnson et al. | 60/226.2 |
| 6,681,559 B2 * | 1/2004 | Johnson | 60/204 |
| 6,684,623 B2 * | 2/2004 | Langston et al. | 60/226.2 |
| 7,370,468 B2 * | 5/2008 | Colotte et al. | 60/226.2 |
| 7,936,082 B2 * | 5/2011 | Boudyaf et al. | 307/9.1 |
| 2006/0101806 A1 * | 5/2006 | Ahrendt | 60/226.2 |

FOREIGN PATENT DOCUMENTS

| | | | |
|---|---|---|---|
| FR | 707098 | 7/1931 | |
| WO | 2006134253 | 12/2006 | |
| WO | WO 2006134253 A1 * | 12/2006 | 244/110 B |

OTHER PUBLICATIONS

International Search Report; PCT/FR2008/001632; Jul. 20, 2009.

\* cited by examiner

SYSTEM FOR CONTROLLING THE COWL OF A TURBOJET ENGINE NACELLE THRUST REVERSER

TECHNICAL FIELD

The present invention relates to a turbojet engine nacelle comprising an air inlet forward section, a median section intended to surround a fan of the turbojet engine and an aft section equipped with at least one thrust reverser system comprising firstly means to deflect at least part of an airflow of the turbojet engine, and secondly at least one mobile cowl which, under the action of at least one electromechanical actuation means, is able to move alternately from a closed position in which it ensures aerodynamic continuity of the nacelle and in which the deflection means are inactive, to an open position in which it opens a passage in the nacelle in which the deflection means are active.

BACKGROUND

An aircraft is propelled by several turbojet engines each housed in a nacelle also housing an assembly of annex actuation devices related to its functioning and ensuring various functions when the turbojet engine is in operation or shut down. These annex actuation devices notably comprise an electro- or hydromechanical actuation system for a thrust reverser and an electro- or hydromechanical system to actuate the cowling intended to allow maintenance operations on the turbojet engine.

The role of the thrust reverser, on landing of an aircraft, is to improve the aircraft's braking capacity by redirecting forwardly at least part of the thrust generated by the turbojet engine. During this phase, the reverser is able to send all or part of the gas flows ejected by the turbojet engine towards the front of the nacelle, thereby generating a counter-thrust which is added to the braking of the aircraft wheels. For this purpose, a thrust reverser either side of the nacelle comprises a mobile cowl which can be moved between a deployed position which opens a passage in the nacelle intended for the deflected flow during a braking phase, and a retracted position which closes this passage during normal operation of the turbojet engine or when the aircraft is at a halt.

At the present time, these actuation systems are chiefly applied via hydraulic or pneumatic cylinders. These cylinders required a transport network for a fluid under pressure obtained either by tapping air on the turbojet engine or by bleeding from the aircraft's hydraulic circuit. Said systems are cumbersome however and require heavy maintenance since the slightest leak in the hydraulic or pneumatic network may have damaging consequences both on the reverser and on other parts of the nacelle. Also, the hydraulic or air cylinders always deliver the maximum power available, which leads to early wear of the equipment.

To overcome these drawbacks related to pneumatic and hydraulic systems, nacelle manufacturers and component suppliers have sought to find a replacement and to use electric actuation systems as much as possible, so as to lighten the nacelle and simplify its functioning notably regarding necessary maintenance cycles and the management of hydraulic or pneumatic fluids. Some nacelle cowling already exists intended for turbojet engine maintenance which is actuated by electric cylinders, and a thrust reverser actuated electrically is described in document EP 0 843 089.

Electric actuation systems provide optimal energy management in relation to the actual power needed for functioning of these systems, whilst taking up less space in the nacelle and not requiring any circulation circuit for fluid under pressure. They also allow integration of control and electronic drive systems such as described in French applications 04.07096 07.07098 and 07.01058 for example.

The electronic management of actuation of the thrust reverser system entails numerous constraints.

First, the thrust reverser function is governed by stringent certification requirements intended to ensure the safety of the system. This certification procedure is most costly.

Next, the control and monitoring functions are generally included in an electronic engine controller (FADEC or EEC) which follows its own certification procedure. Therefore the monitoring parameters and threshold values able to trigger certain actions are hardly accessible and configurable without the engine controller having to undergo a new certification cycle, which is highly costly when the changes made are limited to only a fraction of the operating functions managed by the aircraft computer.

BRIEF SUMMARY

The present invention therefore sets out to overcome the above-mentioned drawbacks by proposing a turbojet engine nacelle comprising a control system for the thrust reverser device, optimizing these aspects.

For this purpose, the present invention relates to a turbojet engine nacelle comprising an air inlet forward section, a median section intended to surround a fan of the turbojet engine, and an aft section equipped with at least one thrust reverser system comprising firstly means to deflect at least part of an airflow of the turbojet engine and secondly at least one mobile cowl which, under the action of at least one electromechanical actuation means, is able to move alternately from a closed position in which it ensures the aerodynamic continuity of the nacelle and in which the deflection means are inactive, to an open position in which it opens a passage in the nacelle and in which the deflection means are active, characterized in that it firstly comprises at least one power control unit able to convert a high voltage electric supply into at least one electric supply intended for the electromechanical actuation means, and at least one drive input for said power control unit, and secondly comprises at least one drive unit for the control unit, distinct and separate from the latter, and comprising at least one control input and at least one drive output intended to be connected to the drive input of the control unit.

Therefore, by making provision for a power control unit and a drive unit that are distinct and separate, each unit is able to be submitted to an appropriate certification procedure and no longer to the certification procedure that is most stringent for the whole.

This also allows the development of suitable on-board software and control electronics for the applied certification procedure. This leads to major savings in time and development costs.

In addition, since the drive function is thereby made separate from the power function it is possible to group together the monitoring and control functions in this drive unit whose onboard software programme(s) and/or electronic equipment can be upgraded and changed more rapidly without having to act on other elements.

Advantageously the drive unit also comprises at least one control output for at least one locking means to lock the thrust reverser system.

Also advantageously, the power control unit comprises at least one dissipation resistor or other dissipation device, for example a system optionally enabling recovery of dissipated energy. Preferably, the dissipation resistor is external to a casing of the corresponding power control unit.

Preferably, the power control unit comprises at least one trapezoidal drive inverter. It is also possible optionally to use vector control.

Further preferably, the power control unit comprises an AC to DC rectifier. Evidently, if the aircraft is provided with a direct current electric system, it is possible to use this direct current.

Advantageously, the power control unit comprises a braking circuit comprising an integrated switch. The role of this switch is to simplify the law governing opening of the thrust reverser.

Advantageously, the power control unit comprises at least one input for a control data item derived from at least one position sensor and/or speed and/or braking sensor for example.

Preferably, the power control unit comprises at least one passive or active smoothing device to eliminate harmonic current.

Advantageously, the nacelle comprises a circuit-breaker arranged between the electric power source and the power control unit.

Advantageously, the power control unit and/or the drive unit comprises at least one input for data derived from an aircraft computer commonly called FADEC or EEC.

Preferably, the power control unit is arranged in a so-called cold portion of the nacelle. Further preferably, the drive unit is located in an avionics rack, the certification costs to implant a device at this point being much less costly.

Advantageously, the drive unit is supplied with low voltage current. Therefore, only the control unit controlling the motors of the electromechanical actuators and requiring strong available electric power is provided with such power. Since the electronic elements of the drive unit only require low electric power, the available energy from the aircraft is not wasted.

Also advantageously, the power control unit and/or the drive unit comprises at least one data output in the direction of an aircraft computer, commonly called FADEC or EEC.

This makes it possible for some software and data processing components to be housed inside the drive unit. Therefore the engine controller receives pre-processed data making it possible to save on own computing resources.

Additionally, this allows the use of so-called active sensors in the nacelle i.e. which directly process measured data. The processing logics for such measurements and notably the threshold values at which an order must be triggered can therefore be more easily controlled and adapted to the turbojet engine concerned.

On this account, the drive unit advantageously comprises at least one input for data derived from at least one sensor, of position- or status-sensor type.

The present invention also relates to an aircraft comprising at least two turbojet engines each housed in a nacelle, characterized in that it is a nacelle according to the invention.

Advantageously, the drive unit is mutualized between at least two nacelles. The number of casings is thereby automatically reduced. Also, the drive unit is thereby located in an area external to the nacelle, or in an avionics rack, allowing for better heat dissipation of the electric and electronic components.

BRIEF SUMMARY OF THE DRAWINGS

The implementation of the invention will be better understood with the aid of the detailed description given below with reference to the appended drawings.

DETAILED DESCRIPTION

Figure 1:
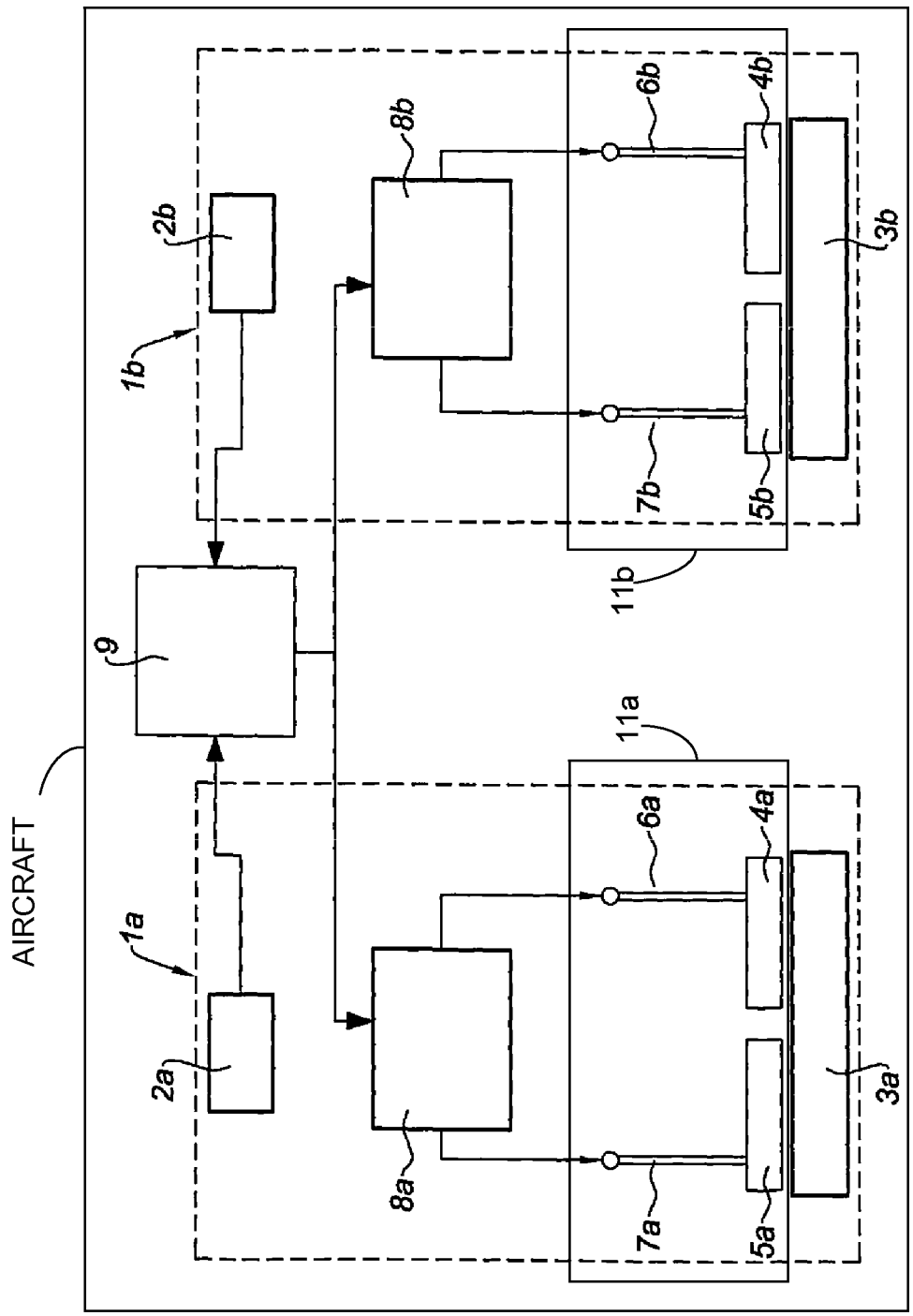
FIG. 1 is a simplified schematic of a system according to the invention equipping two turbojet engine nacelles.

FIG. 1 schematically illustrates a propelling assembly for an aircraft comprising two turbojet engines 3a,3b each housed in a nacelle 1a,1b.

Each turbojet engine 3a,3b is associated with an engine controller 2a 2b commonly called FADEC or EEC.

Each nacelle 1a,1b also comprises a thrust reverser device 11a, 11b each comprising a right door 4a,4b and a left door 5a,5b each able to be actuated respectively by at least one electromechanical actuator 6a,6b, 7a,7b.

According to the invention, the electric supply and the controlling of each electromechanical actuator 6a,6b, 7a,7b is performed by a power control unit 8a,8b equipping each nacelle 1a,1b.

In addition, according to the invention, each power control unit 8a,8b receives its control instructions from a separate drive unit 9 common to the two nacelles 1a,1b.

Also, the drive unit 9 additionally receives data from each of the engine controllers 2a,2b.

Figure 2:
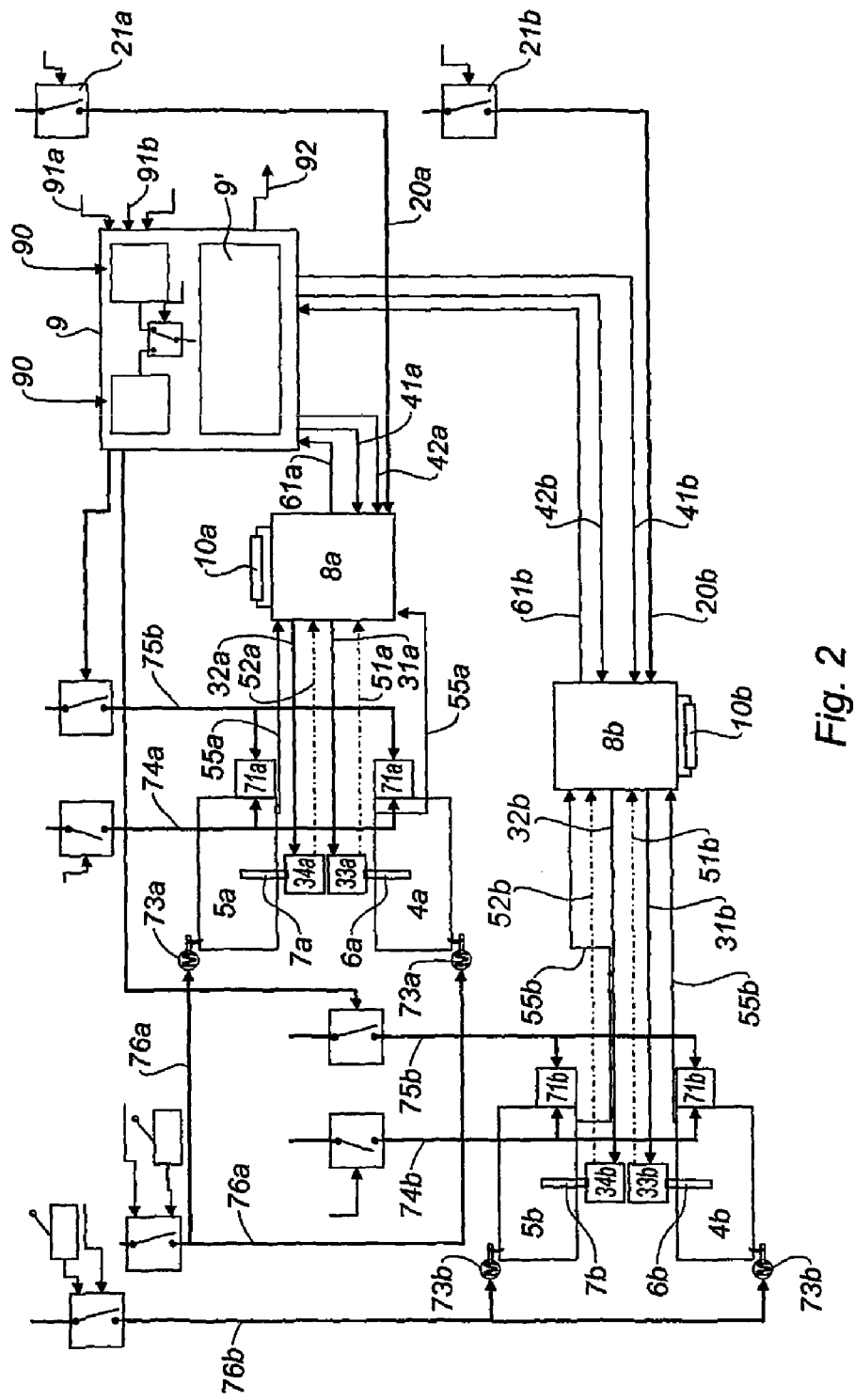
FIG. 2 is a schematic illustration of a first embodiment of a control system equipping a nacelle according to the invention.

FIG. 2 details the connections between these different items of equipment.

According to the system shown FIG. 2, each power control unit 8a,8b comprises a high-power electric supply 20a,20b derived from an aircraft electric supply source, each supply 20a,20b is equipped with a safety circuit breaker 21a,21b.

Each power control unit 8a,8b also comprises two control outputs 31a,31b and 32a,32b supplying and respectively controlling a motor 33a,33b and a motor 34a,34b of each electromechanical actuator 6a,6b and 7a,7b in relation to two control inputs 41a,41b and 42a,42b respectively transmitting deployment and closing orders from the drive unit 9.

Each power control unit 8a,8b also comprises two data inputs 51a,51b and 52a,52b receiving data from a position sensor of the motors 33a,33b and 34a,34b, and a data output 61a,61b sending data representing the status of the thrust reverser system towards the drive unit 9. In addition to the data from the position sensors, the power control units 8a,8b also receive data from a braking detector along a line 55a,55b.

Evidently, the data received and sent are not limited to the types of data presented in the example, but may be any kind of data necessary for power management electronics and process logics.

It is also to be noted that each power control unit 8a,8b comprises an electric dissipation resistor 10a,10b.

Each door 4a, 4b, 5a, 5b is also locked in closed position by at least one primary lock 71a,71b and a tertiary lock 73a,73b.

Each primary lock 71a, 71b is controlled by a dual control line having a first control line 74a,74b driven by the corresponding engine controller 2a,2b, and a second control line 75a,75b driven by the drive unit 9.

Each tertiary lock 73a, 73b is controlled by a control line 76a,76b driven directly by aircraft parameters such as altitude, pressure on landing gear, or directly by the engine controller 2a,2b.

Each primary 71a,71b and tertiary lock 73a,73b can be associated with a position sensor whose data are transmitted to drive unit 9. For reasons of clarity, these lines are not shown in the schematic in FIG. 2.

These lines may be two-way and control inductive- and passive-type sensors whose electronics are concentrated in the drive unit 9.

According to the invention, the power control units 8a,8b are therefore driven by the drive unit 9.

The drive unit 9 has a low-power electricity supply, supplied by one or more electric buses 90.

The drive unit 9 comprises a monitoring sub-unit 9' receiving measurements from the data outputs 61a and 61b of the power control units 8a,8b, and from various sensors and from parameters derived from the engine controllers 2a,2b along data lines 91a,91b.

Evidently, the number of data inputs and the type of such data is not limited to the description given in this example, and the drive unit 9 may use any data needed for the proper functioning of its software and on-board electronic components.

The drive unit 9 also sends data on the locking or unlocking status of the thrust reverser system towards the engine controllers 2a,2b along at least one data output line 92.

Therefore, when the pilot of the aircraft lowers or raises the lever controlling the opening or closing of the thrust reverser system, the engine controllers 2a, 2b transmit this order to the drive unit 9 and to the primary 71a,71b and tertiary 73a,73b locks. The drive unit 9 then independently manages the corresponding sequences and sends instructions to the primary 71a,71b and tertiary 73a,73b locks and to the power control units 8a,8b which then manage the power delivered to the motors 33a,33b and 34a,34b of each electromechanical actuator 6a,6b and 7a,7b.

Further evidently, the drive unit 9 is not limited to a single monitoring sub-unit 9' but may comprise separate sub-units for the management of each nacelle 1a,1b, the different data and control lines optionally being redundant as a safety measure in the event of a line fault.

Although the invention has been described with one particular example of embodiment, it is evidently not limited thereto and comprises all technical equivalents of the described means and their combinations, if these come under the scope of the invention. In particular, the connection with the engine controllers 2a 2b may be two-directional i.e. allowing both data to be provided by the engine controllers and the sending of data to these controllers. Also, the location of the various units is given by way of indication and is in no way limiting. For example the power control units could also be positioned outside the nacelle.

The invention claimed is:

1. An aircraft comprising at least two turbojet engines each housed in a nacelle, wherein the nacelle comprises:
   an air inlet forward section,
   a median section surrounding a fan of the turbojet engine,
   an aft section equipped with at least one thrust reverser system comprising at least one mobile cowl which, under action of at least one electromechanical actuation means, is able alternately to move from a closed position in which the mobile cowl provides the aerodynamic continuity of the nacelle, to an open position in which the mobile cowl opens a passage in the nacelle,
   at least one power control unit per turbojet engine able to convert a high voltage electric supply into at least one electric supply towards electromechanical actuation means, each power control unit being located within the nacelle of its respective turbojet engine, and
   at least one drive unit for the power control unit,
   wherein the at least one drive unit receives instructions from an engine controller and is physically distinct and separate from the at least one power control unit and comprises at least one control input and at least one drive output being connected to the power control unit,
   wherein the at least one separate drive unit is common to the at least two nacelles and is located outside the at least two nacelles.

2. The aircraft according to claim 1, wherein the drive unit comprises at least one control output for at least one locking means of the thrust reverser system.

3. The aircraft according to claim 1, wherein the power control unit comprises at least one dissipation resistor external to a casing of the corresponding power control unit.

4. The aircraft according to claim 1, wherein the power control unit comprises at least one trapezoidal drive inverter.

5. The aircraft according to claim 1, wherein the power control unit comprises an AC to DC rectifier.

6. The aircraft according to claim 1, wherein the power control unit comprises a braking circuit comprising an integrated switch.

7. The aircraft according to claim 1, wherein the power control unit comprises at least one input for control data from at least one position sensor and/or speed and/or braking sensor.

8. The aircraft according to claim 1 wherein the power control unit comprises at least one passive or active smoothing device to eliminate harmonic current.

9. The aircraft according to claim 1, wherein the nacelle comprises a circuit breaker arranged between an electric power source and the power control unit.

10. The aircraft according to claim 1, wherein the power control unit is arranged in a so-called cold portion of the nacelle.

11. The aircraft according to claim 1 wherein the drive unit is supplied with a low voltage.

12. The aircraft according to claim 1, wherein at least one of the power control unit and the drive unit comprises at least one data output towards the engine controller.

13. The aircraft according to claim 1, wherein the drive unit comprises at least one input of data from at least one sensor of position of status type.

* * * * *